Jan. 6, 1948. F. C. MORRISON 2,434,219
HOSE COUPLING
Filed April 17, 1944
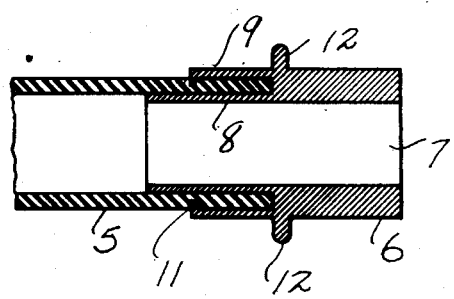
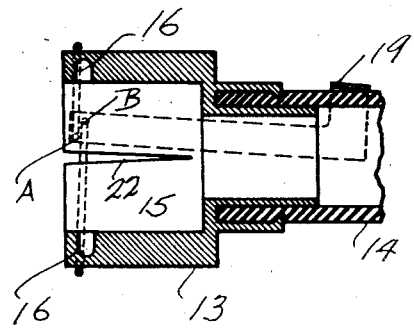
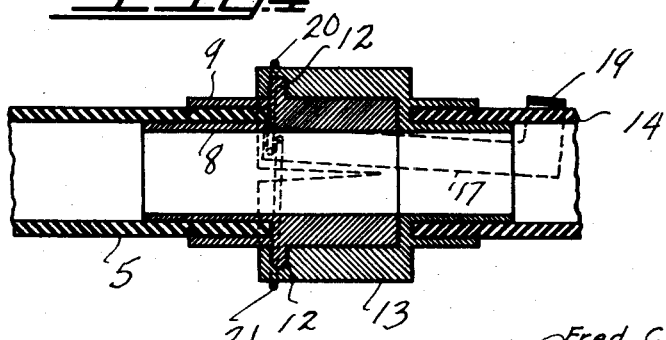
INVENTOR.
Fred C. Morrison
BY Edward C. Healy
ATTORNEY.

Patented Jan. 6, 1948

2,434,219

UNITED STATES PATENT OFFICE 2,434,219

HOSE COUPLING

Fred C. Morrison, Babbitt, Nev.

Application April 17, 1944, Serial No. 531,337

3 Claims. (Cl. 285—171)

This invention relates to hose couplings and has particular reference to a coupling of the male and female type, and has for its primary object the provision of a coupling that is equipped with economically constructed novel means, whereby a quick and easy attaching and detaching of the male and female members of the coupling may be effected.

A further object of the invention is the provision of a pivoted lever member carried by the female portion of the coupling to force the male and female members into positive, automatic locking engagement to prevent the escape of air, gas, or liquid that passes through the coupling, thereby dispensing with the necessity of machining either the male or female parts to provide a positive fit.

An additional object of the invention is the production of a coupling of the character described that in addition to being economical to manufacture, strong and durable, is most serviceable and efficient in operation.

Other objects and advantages will be apparent during the course of the following description.

In the accompanying drawings forming a part of this description and in which like numerals are employed to designate like parts throughout the same;

Fig. 1 is a longitudinal section of the male member of the invention secured to a section of hose.

Fig. 2 is a similar section of the female member with the locking lever being illustrated in dotted lines, the said member being likewise secured to a section of hose.

Fig. 3 is a longitudinal section of the female member in an expanded position to receive the male member, the locking lever and its associated link connections being shown partly in elevation and partly in section, and Fig. 4 is a longitudinal section of the male and female members, with the locking lever in operating position for securing the joint between the hose sections and Fig. 5 is an end elevational view of one of the clamping links with the pair of lever arms, to which the links are pivotally connected, being shown in section.

In the accompanying drawing the numeral 5 designates a section of hose to which is detachably secured an insert 6 made of pliable material. This insert is of tubular formation and has a central bore 7. An extension 8 integrally formed with the body of the insert is positioned within the hose section 5, while an annular ring 9 equipped with a pointed flange 11, cooperates with the extension 8 serves to retain the hose section in position in the insert. It will be noted, as disclosed to advantage in Fig. 1, that the periphery of the insert is equipped with diametrically opposed circumferential lugs or projections 12, the purpose of which will be hereinafter described.

The female member 13 of the coupling, as disclosed to advantage in Fig. 2, is likewise made of pliable material and is equipped with the same means for engagement with a hose section 14 as employed in the insert 6. A description of this means is accordingly unnecessary. The female member, however, differs from the insert in the following characteristics. It is provided with a large bore 15 capable of receiving therein the body of the insert when the male and female members are joined and are in operative position for securing the joint. (See Fig. 4.) It will be noted that the said member 13 has internal slots 16 provided therein, which slots are adapted to receive the lugs 12 of the male member of the coupling, through the medium of which control over the male member is maintained.

To provide means for the contraction and expansion of the female member of the coupling, I have utilized a combined lever and a link connections that are associated with the said female member. This construction embodies a lever that includes a pair of arms 17 that are connected by a semi-circular cross piece 19 that rests on the outer periphery of the hose section 14. This cross piece may be termed the removing or actuating portion of the lever. It will be observed that the extremities of the arms 17 are anchored to the female member permanently by stationary pins, as at A. The contraction and expansion of said female member is controlled by the lever arm from the point B. To effect this contraction and expansion semi-circular link members 20 and 21 encircle the upper and lower sections, respectively, of the female member 14, the upper and lower sections being defined by longitudinal slots 22 formed in the body of said female member.

In the operation of securing the joint, the moving end of the lever is raised above the upper section of the female member and assumes the position of Fig. 3. Since the fulcrum A is stationary, action will be forced to the point B and to the link members 20 and 21, which will effect an expansion of the lower section of the female member and consequently enlarge the female member of the coupling to position it in a receptive state. The insert 6 is then moved into the enlarged bore of the female member. Thereafter, the moving end of the lever is returned to its normal position of Figs. 2 and 4. Simultaneously the longitudinal slots 22 will assume a narrow or restricted position of Fig. 2, as compared to the spread position of Fig. 3. Since the lugs 12 will have entered the slots 16 of the female member, the male portion of the coupling will be held firmly in place within the female member of the coupling. It will be observed that the lever resting on the hose section 14 will be held there by the force exerted by the connector running from the point B through the base of the lower section.

It is to be noted that since the female section is sufficiently pliable or resilient, it will readily contract and expand without danger of breakage. Should pliable material be unobtainable, or if I desire to employ non-pliable material, the female member could readily be made in two sections, and a pin type hinge could be utilized in the center of each section. Likewise, conventional gaskets could be employed to assure a water-tight connection.

It is understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A coupling comprising a pliable insert secured to a hose section and defining the male member of the coupling, a pliable female member having a section of hose secured thereto, said female member being longitudinally slotted to permit expansion and contraction of the same, cooperating locking means associated with said male and female members, and a locking lever mounted on said female member, link connections encircling said female member and adapted to be actuated by the manual operation of said lever to bring said locking means into operative position and to automatically lock said male and female members to secure a joint.

2. A coupling comprising a pliable insert adapted to be secured to a hose section and defining the male member of a coupling, a pliable female member having a section of hose secured therein, cooperating locking means associated with said male and female members, a locking lever mounted on said female member and capable of bringing said cooperating locking means into operative position, said locking means comprising peripheral lugs formed on said insert and an internal annular slot provided in said female member to receive the lugs of said insert, said female member being longitudinally slotted to permit expansion and contraction of the same, and semi-circular links on said female member adapted to be actuated by the manual operation of said lever to bring said locking means into operative position and to automatically lock said male and female members to secure a joint.

3. A coupling comprising a pliable insert adapted to be secured to a hose section and defining the male member of a coupling, a pliable female member having a section of hose secured therein, cooperating locking means associated with said male and female members, a locking lever mounted on said female member and capable of bringing said cooperating locking means into operative position, said locking means comprising peripheral lugs formed on said insert and an internal annular slot provided in said female member to receive the lugs of said insert, said female member being longitudinally slotted to permit expansion and contraction of the same, and a semi-circular link encircling each of the slotted sections of said female member and having their ends connected to said lever to define the pivotal connection of the links with said female member, said links adapted to be actuated by the manual actuation of said lever to bring said locking means into operative position and to automatically lock said male and female members to secure a joint.

FRED C. MORRISON.

REFERENCES CITED

The following references are of record in the file of this patent:

UNITED STATES PATENTS

| Number | Name | Date |
|---|---|---|
| 759,270 | Grier | May 10, 1904 |
| 1,143,136 | Relitz | June 15, 1915 |